(12) United States Patent
Nagaoka (10) Patent No.: US 8,317,582 B2
(45) Date of Patent: Nov. 27, 2012

(54) GAME CONTROL PROGRAM, GAME DEVICE AND GAME CONTROL METHOD

(75) Inventor: Yasuhito Nagaoka, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 473 days.

(21) Appl. No.: 12/565,072

(22) Filed: Sep. 23, 2009

(65) Prior Publication Data

US 2010/0197375 A1    Aug. 5, 2010

(30) Foreign Application Priority Data

Jan. 30, 2009    (JP) .................................. 2009-020866

(51) Int. Cl.
 *A63F 9/24* (2006.01)
 *A63F 13/00* (2006.01)
(52) U.S. Cl. .............................................. 463/9; 463/32
(58) Field of Classification Search .................. 463/9, 32
 See application file for complete search history.

(56) References Cited

U.S. PATENT DOCUMENTS

| 6,027,117 | A | * | 2/2000 | Goldberg ................... 273/157 R |
| RE36,675 | E | * | 4/2000 | Yamamoto et al. ............. 463/10 |
| 6,093,104 | A | * | 7/2000 | Kasahara et al. ............... 463/30 |
| 7,819,732 | B2 | * | 10/2010 | Asuna et al. ....................... 463/7 |
| 2007/0266181 | A1 | * | 11/2007 | Watanabe ........................ 710/1 |
| 2007/0287517 | A1 | | 12/2007 | Asuna et al. |
| 2008/0227515 | A1 | * | 9/2008 | Kershaw ......................... 463/14 |
| 2010/0016049 | A1 | * | 1/2010 | Shirakawa et al. ............... 463/9 |

FOREIGN PATENT DOCUMENTS

| EP | 1 033 706 | 9/2000 |
| JP | 2002-301265 | 10/2002 |
| JP | 2006-87496 | 4/2006 |
| JP | 2007-260116 | 10/2007 |
| JP | 2007-313024 | 12/2007 |

OTHER PUBLICATIONS

Carbonated Games, Hexic, Published by Microsft Game Studios, Released Jul. 2003, as evidenced by the screen shots document created from the YouTube.com video viewed from http://www.youtube.com/watch?v=0LYuFoHlFnM, with an upload date of Dec. 6, 2006.*
Notification of Reason(s) for Refusal dated Jan. 6, 2011, from corresponding Japanese Application No. 2009-020866.

(Continued)

*Primary Examiner* — Arthur O. Hall
*Assistant Examiner* — Nicholas Ditoro
(74) *Attorney, Agent, or Firm* — Katten Muchin Rosenman LLP (57) ABSTRACT

A game device includes an object arrangement changing unit for changing the arrangement of objects, which are of plural kinds, placed in a game field following an instruction from a user, an arrangement condition determining unit for determining objects that meet an arrangement condition for erasure out of a plurality of objects placed in the game field and selecting the objects that meet the arrangement condition as objects to be erased, an object kind changing unit for changing the kind of the objects selected as objects to be erased, and an object erasing unit for erasing the objects selected as objects to be erased. The arrangement condition determining unit determines again objects that meet the arrangement condition and further selects objects that newly meet the arrangement condition as objects to be erased, during a time from when the kind of the objects selected as objects to be erased is changed by the object kind changing unit until when the objects are erased by the object erasing unit.

6 Claims, 11 Drawing Sheets

OTHER PUBLICATIONS

Notification of Reason(s) for Refusal dated May 24, 2011, from corresponding Japanese Application No. 2009-020866.

Decision of Refusal dated Dec. 6, 2011, from corresponding Japanese Application No. 2009-020866.

* cited by examiner

| 4 | 2 | 1 | 3 | 3 | 4 | 2 | 2 |
|---|---|---|---|---|---|---|---|
| 3 | 1 | 4 | 2 | 1 | 3 | 4 | 1 |
| S | 4 | 1 | 1 | 3 | 3 | 3 | 4 |
| 2 | 3 | 2 | 4 | 1 | 2 | 1 | 2 |
| 1 | 4 | 1 | 1 | 1 | 2 | 2 | 4 |
| 4 | 3 | 4 | 4 | 1 | 4 | 1 | 3 |
| 2 | 4 | 1 | 2 | 4 | 3 | 4 | 4 |
| 1 | 3 | 4 | 1 | 3 | 4 | 2 | 3 |

FIG.3

| OBJECT ID (80) | POSITION (81) | KIND (82) | ELAPSED TIME (83) | STATUS (84) |
|---|---|---|---|---|
| 01 | (1, 1) | 4 | 22 | NORMAL |
| 02 | (1, 2) | 3 | 73 | FIXED |
| 03 | (1, 3) | 2 | 2 | SPECIAL |
| : | : | : | : | : |

| 4 | 2 | 1 | 3 | 3 | 4 | 2 | 2 |
|---|---|---|---|---|---|---|---|
| 3 | 1 | 4 | 2 | 1 | 3 | 4 | 1 |
| S | 4 | 2 | 1 | 3 | 3 | 3 | 4 |
| 2 | 3 | 4 | 1 | 1 | 2 | 1 | 2 |
| 1 | 4 | 1 | 1 | 1 | 2 | 2 | 4 |
| 4 | 3 | 4 | 4 | 1 | 4 | 1 | 3 |
| 2 | 4 | 1 | 2 | 4 | 3 | 4 | 4 |
| 1 | 3 | 4 | 1 | 3 | 4 | 2 | 3 |

FIG.5

|   |   |   | 71 |   | 72 |   | 70 |
|---|---|---|---|---|---|---|---|
| 4 | 2 | 1 | 3 | 3 | 4 | 2 | 2 |
| 3 | 1 | 4 | 2 | 1 | 3 | 4 | 1 |
| ☆S | 4 | 2 | 1 | 4 | 1 | 3 | 4 |
| 2 | 3 | 4 | 1 | 1 | 2 | 1 | 2 |
| 1 | 4 | 1 | 1 | 1 | 2 | 2 | 4 |
| 4 | 3 | 4 | 4 | 3 | 3 | 1 | 3 |
| 2 | 4 | 1 | 2 | 4 | 3 | 4 | 4 |
| 1 | 3 | 4 | 1 | 3 | 4 | 2 | 3 |

FIG.6

| 4 | 2 | 1 | 3 | 3 | 4 | 2 | 2 |
|---|---|---|---|---|---|---|---|
| 3 | 1 | 4 | 2 | 1 | 3 | 4 | 1 |
| 2 | 4 | 2 | 1 | 4 | 1 | 3 | 4 |
| 2 | 3 | 4 | 2 | 2 | 2 | 1 | 2 |
| 1 | 4 | 1 | 2 | 2 | 2 | 2 | 4 |
| 4 | 3 | 4 | 4 | 3 | 3 | 1 | 3 |
| 2 | 4 | 1 | 2 | 4 | 3 | 4 | 4 |
| 1 | 3 | 4 | 1 | 3 | 4 | 2 | 3 |

FIG.7

|   |   | 71 |   |   | 73 | 70 |   |
|---|---|---|---|---|---|---|---|
| 4 | 2 | 1 | 3 | 3 | 4 | 2 | 2 |
| 3 | 1 | 4 | 2 | 1 | 3 | 4 | 1 |
| 2 | 4 | 2 | 1 | 4 | 1 | 3 | 4 |
| 2 | 3 | 4 | 2 | 2 | 2 | 1 | 2 |
| 1 | 4 | 1 | 2 | 2 | 2 | 2 | 4 |
| 4 | 3 | 4 | 4 | 3 | 3 | 1 | 3 |
| 2 | 4 | 1 | 2 | 4 | 3 | 4 | 4 |
| 1 | 3 | 4 | 1 | 3 | 4 | 2 | 3 |

| 4 | 2 | 1 | 3 | 3 | 4 | 2 | 2 |
|---|---|---|---|---|---|---|---|
| 3 | 1 | 4 | 2 | 1 | 3 | 4 | 1 |
| 2 | 4 | 2 | 1 | 4 | 1 | 3 | 4 |
| 2 | 3 | 4 | 2 | 3 | 3 | 1 | 2 |
| 1 | 4 | 1 | 2 | 3 | 3 | 2 | 4 |
| 4 | 3 | 4 | 4 | 3 | 3 | 1 | 3 |
| 2 | 4 | 1 | 2 | 4 | 3 | 4 | 4 |
| 1 | 3 | 4 | 1 | 3 | 4 | 2 | 3 |

FIG.10

| 4 | 2 | 1 | 3 | 3 | 4 | 2 | 2 |
|---|---|---|---|---|---|---|---|
| 3 | 1 | 4 | 2 | 1 | 3 | 4 | 1 |
| 2 | 4 | 2 | 1 | 4 | 1 | 3 | 4 |
| 2 | 3 | 4 | 2 | 3 | 3 | 1 | 2 |
| 1 | 4 | 1 | 2 | 4 | 4 | 2 | 4 |
| 4 | 3 | 4 | 4 | 4 | 4 | 1 | 3 |
| 2 | 4 | 1 | 2 | 4 | 3 | 4 | 4 |
| 1 | 3 | 4 | 1 | 3 | 4 | 2 | 3 |

FIG.11

|   |   |   | 71 |   |   |   | 70 |
|---|---|---|---|---|---|---|---|
| 4 | 2 | 1 | 3 | 3 | 4 | 2 | 2 |
| 3 | 1 | 4 | 2 | 1 | 3 | 4 | 1 |
| 2 | 4 | 2 | 1 | 4 | 1 | 3 | 4 |
| 2 | 3 | 4 |   |   |   | 1 | 2 |
| 1 | 4 | 1 |   |   |   | 2 | 4 |
| 4 | 3 | 4 | 4 |   |   | 1 | 3 |
| 2 | 4 | 1 | 2 | 4 | 3 | 4 | 4 |
| 1 | 3 | 4 | 1 | 3 | 4 | 2 | 3 |

GAME CONTROL PROGRAM, GAME DEVICE AND GAME CONTROL METHOD

BACKGROUND OF THE INVENTION

1. Field of the Invention

The present invention relates to a game control technology and, in particular, to a game control program, a game device, and a game control method for controlling a game in which an arrangement in a predetermined pattern is realized by changing the positions of objects placed in a game field.

2. Description of the Related Art

There are puzzle games that are played by dropping a plurality of objects onto a game field, arranging the objects in such a manner as to meet a predetermined condition and erasing those objects meeting the condition.

Related Art List (1) European Patent Application Publication No. 1033706

A variety of Tetris type games each featuring uniqueness and ingenuity in shape, arrangement and the like of objects therein are being proposed, and yet the demand is great for action puzzle games that excel in originality and quality of entertainment.

SUMMARY OF THE INVENTION

The present invention has been made in view of the foregoing circumstances, and a purpose thereof is to provide a game control technology that enhances the quality of entertainment.

One embodiment of the present invention relates to a game control program. This game control program executed by a computer includes the functions of: changing an arrangement of objects, which are of plural kinds, placed in a two-dimensional or three-dimensional game field following an instruction from a user; determining objects that meet an arrangement condition for erasure thereof out of a plurality of objects placed in the game field and selecting the objects that meet the arrangement condition as objects to be erased; changing the kind of the objects selected as objects to be erased; and erasing the objects selected as objects to be erased after a predetermined time lapse from the changing of the kind thereof by the changing, wherein the determining determines again objects that meet the arrangement condition and further selects objects that newly meet the arrangement condition as objects to be erased, during a time period from the changing of the kind of the objects selected as objects to be erased by the changing the kind thereof to the erasure of the objects by the erasing.

Optional combinations of the aforementioned constituting elements, and implementations of the invention in the form of methods, apparatuses, systems and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

A game device according to an embodiment of the present invention provides a game in which plural kinds of objects are placed in a two-dimensional or three-dimensional game field, the positions of those objects are changed according to instructions from a user, and the objects that meet a predetermined arrangement condition are erased. In this embodiment, four kinds of square objects are placed in a two-dimensional game field. Each of the objects belongs to one of the kinds, which are "1", "2", "3", and "4". The user changes the arrangement of the objects by operating a cursor in such a manner as to get a set of four (2 vertical times 2 horizontal) objects of the same kind and can erase those objects once lined up with the same kind of objects.

In this embodiment, when a set of four objects is lined up with the same kind, the objects are temporarily changed to another kind of objects before they are erased. To be more specific, objects "1" are changed to "2", objects "2" are changed to "3", objects "3" are changed to "4", and objects "4" are changed to "1". With the kind of objects changed to another, there arise new possibilities of the objects, in combination with adjacent ones, meeting the predetermined arrangement condition. The objects newly meeting the arrangement condition in this manner are also made the objects to be erased. In this embodiment, therefore, the kind of objects to be erased is temporarily changed before the erasure of the objects and the objects selected as ones to be erased based on the temporarily changed arrangement of the objects can also be erased, so that the linked erasure of objects can provide a newly added sense of entertainment.

Figure 1:
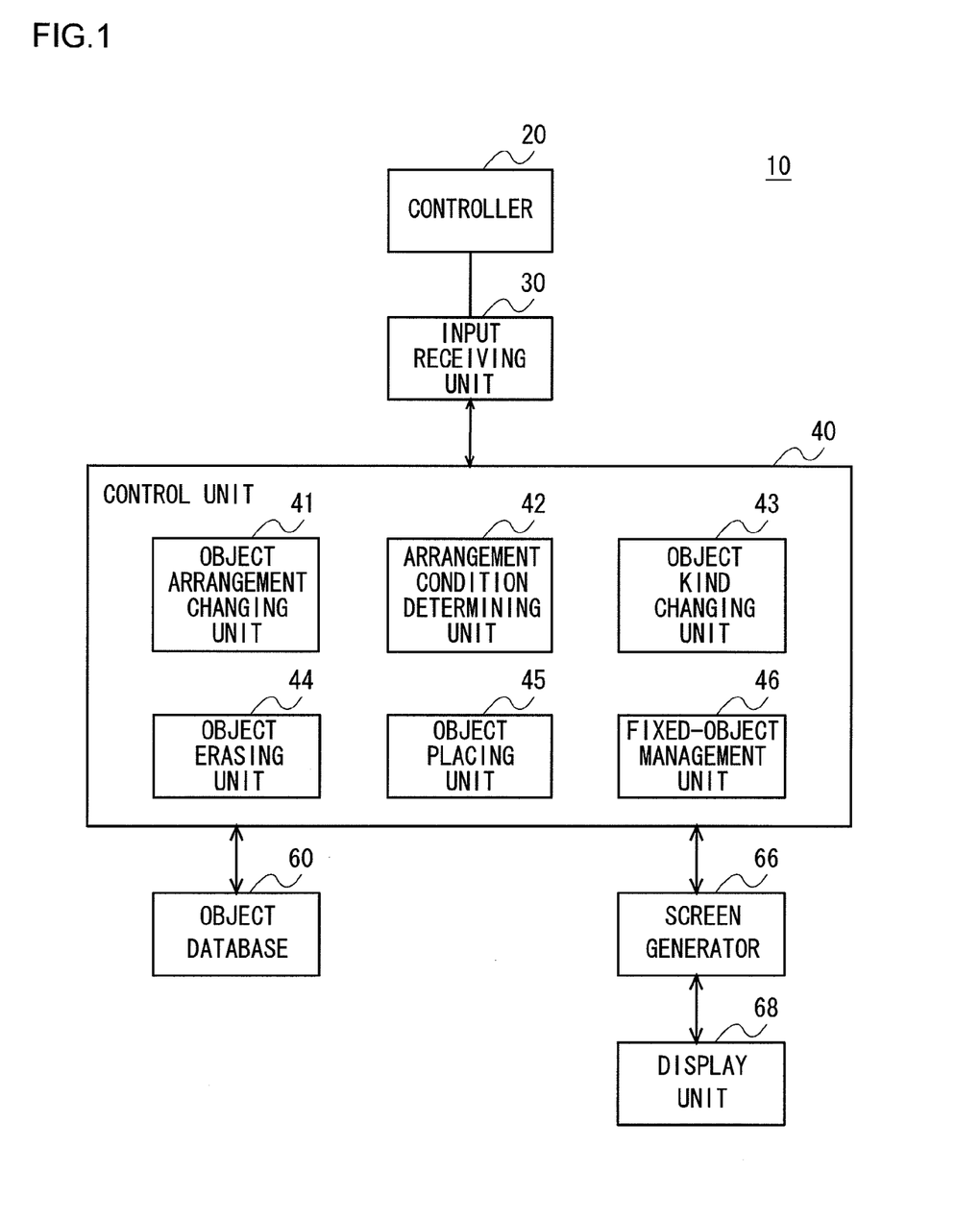
FIG. 1 shows a structure of a game device according to an embodiment.

FIG. 1 shows a structure of a game device 10 according to an embodiment. The game device 10 includes a controller 20, an input receiving unit 30, a control unit 40, an object database 60, a screen generator 66, and a display unit 68. These structural components may be achieved hardwarewise by elements such as a CPU, memory and the like of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

The input receiving unit 30 receives control signals inputted from the controller 20 operated by a player. The control unit 40 manages the progress of a game by controlling the arrangement and the like of the objects in the game field based on the operation inputs from the player that are received by the input receiving unit 30. The screen generator 66 generates the screen of the game to be controlled by the control unit 40 and has the screen displayed on the display unit 68.

Figure 2:
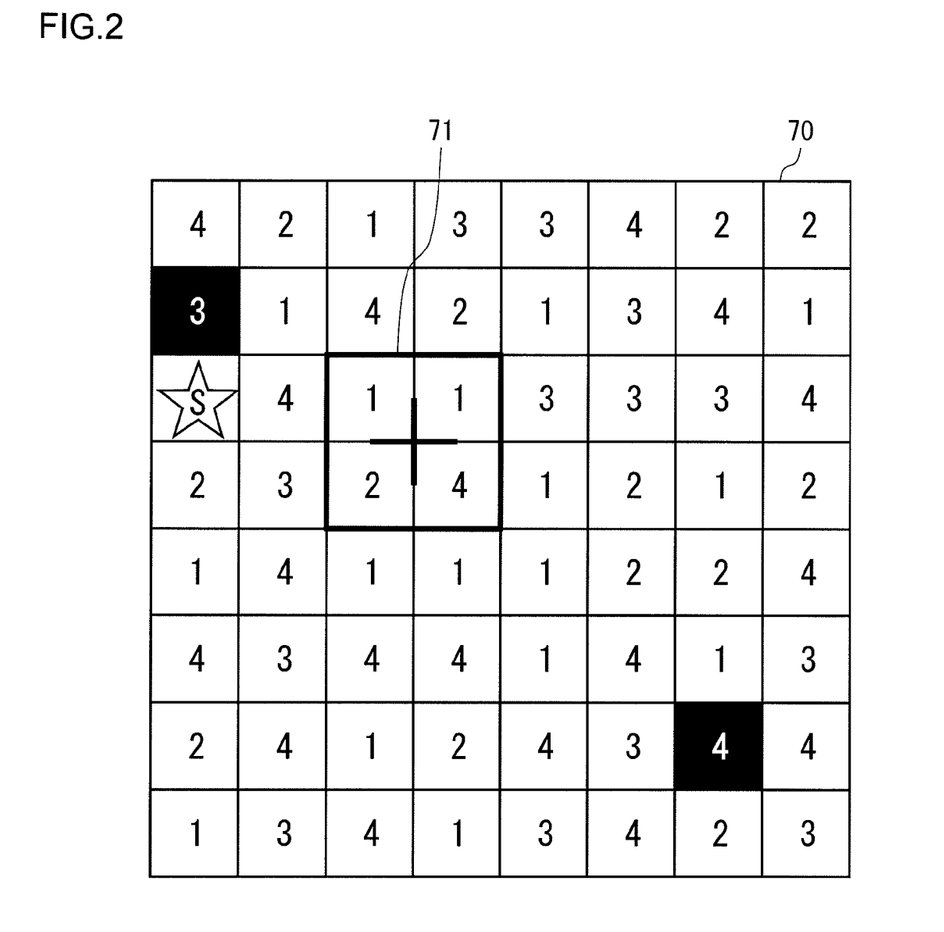
FIG. 2 shows an example of a screen displayed on a display unit.

FIG. 2 illustrates an example of a screen displayed on the display unit 68. Displayed on the display screen are sixty four objects placed in 8 rows and 8 columns in a two-dimensional game field 70 and a cursor 71 to be operated to change the arrangement of the objects. The cursor 71, which has a square shape containing four (2 vertical times 2 horizontal) objects, can change the arrangement of objects by rotating clockwise or counterclockwise the four objects therewithin.

Figure 3:
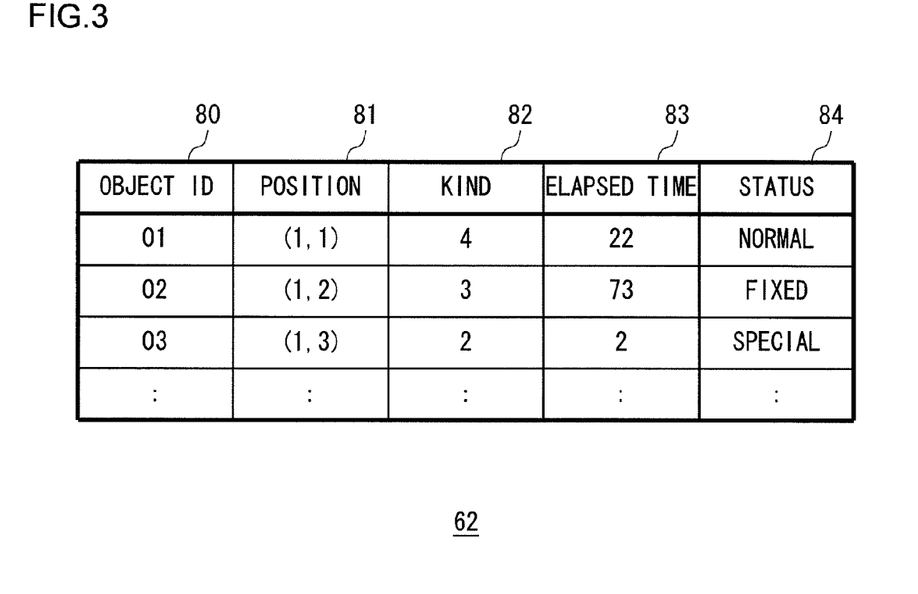
FIG. 3 shows an example of internal data of an object database.

FIG. 3 shows an example of internal data of the object database 60. The object database 60 has an object ID field 80, a position field 81, a kind field 82, an elapsed time field 83, and a status field 84. The object ID field 80 stores the IDs of objects placed in the game field 70. The position field 81 stores coordinates representing the positions of the objects. The kind field 82 stores the kinds of objects. The elapsed time field 83 stores the elapsed time from when the objects are last moved. As will be discussed later, the elapsed time is used in the determination of whether to restrict the changing of the arrangement of objects or not. The status field 84 stores the data showing the status of each object. The status of an object includes, for instance, "normal", "fixed", "special", and "to be erased".

Referring back to FIG. 1, the control unit 40 will be further described. An object arrangement changing unit 41 changes the arrangement of plural kinds of objects placed in a two-dimensional or three-dimensional game field 70, following instructions from the user. The object arrangement changing unit 41 retains coordinates showing the present position of the cursor 71 and updates them by moving the cursor 71 up or down, right or left in the game field 70 according to an instruction input from an arrow key or the like on the controller 20, for instance. Also, the object arrangement changing unit 41 rotates the objects contained in the cursor 71 clockwise or counterclockwise according to an instruction input from a button or the like on the controller 20, for instance. The arrangement may be such that both a button for rotating the objects clockwise and a button for rotating them counterclockwise are provided. When the objects contained in the cursor 71 are rotated, the object arrangement changing unit 41 may indicate the ongoing movement so as to clearly show in which direction they are being rotated. On completion of the changing of the arrangement of objects, the object arrangement changing unit 41 updates data on applicable objects in the position field 81 of the object database 60.

An arrangement condition determining unit 42 determines objects that meet an arrangement condition for erasure thereof out of a plurality of objects placed in the game field 70 and selects the objects that meet the arrangement condition as objects to be erased. In the present embodiment, the arrangement condition determining unit 42 stores the kinds of the four (2 vertical times 2 horizontal) objects being the same as the arrangement condition for erasure thereof. The arrangement condition determining unit 42 changes data on the objects selected as ones to be erased in the status field 84 of the object database 60 to "to be erased".

The arrangement condition determining unit 42 may search for objects meeting the arrangement condition at predetermined time intervals or may search for them within a range containing changed objects when the arrangement or the kind of objects is changed. As will be discussed later, after the kind of objects, which are ones to be erased, is changed by an object kind changing unit 43, the arrangement condition determining unit 42 must always carry out a process of determining objects that meet the arrangement condition.

The object kind changing unit 43 changes the kind of objects that are selected as ones to be erased by the arrangement condition determining unit 42. In this embodiment, as previously indicated, the object kind changing unit 43 changes "1" to "2", "2" to "3", "3" to "4", and "4" to "1". The object kind changing unit 43 may also display in animation how the kind of the objects is changed. For example, a cube of which the square displayed as an object is one of the faces is rotated about an axis, or a straight line parallel to the screen and a side of the square, so that another face of the cube is displayed to show how the kind of the objects is changed. The object kind changing unit 43 updates data on applicable objects in the kind field 82 of the object database 60.

The arrangement condition determining unit 42 again determines objects meeting the arrangement condition and further selects the objects that newly meet the arrangement condition as objects to be erased, during the time from the changing of the kind of the objects selected as ones to be erased by the object kind changing unit 43 till the erasure of the objects by an object erasing unit 44. For example, when the objects selected as ones to be erased are changed from "1" to "2", there arise possibilities that they, in combination with objects "2" placed in their surroundings, newly meet the arrangement condition. At this time, the arrangement condition determining unit 42 further selects the objects newly meeting the arrangement condition as ones to be erased and updates data in the object database 60. And the objects newly selected as ones to be erased are further subjected to the changing of the kind thereof by the object kind changing unit 43 and another determination as to the arrangement condition. This enables objects to be selected as ones to be erased in a chain-reaction manner. It may be so arranged that when objects are erased in a chain reaction, the control unit 40 awards the user a higher point.

The object erasing unit 44 erases the objects selected as ones to be erased after a predetermined time lapse from the changing of the kind thereof by the object kind changing unit 43. The object erasing unit 44 may measure the predetermined time lapse with a built-in timer. The object erasing unit 44 initializes the kind field 82, the elapsed time field 83, and the status field 84 of the erased objects in the object database 60. In the case where new objects meet the arrangement condition as a result of the user's changing the arrangement of objects before the erasure of the objects selected as ones to be erased, those new objects may be placed on standby as objects for chain-reaction erasure for another predetermined time lapse.

After a predetermined time lapse from erasure of objects, an object placing unit 45 generates new objects and places them in the positions of the erased objects. Until the predetermined time passes after the erasure of objects, the game may also be played on the premise that there is no objects in the positions. For example, in the case where the cursor 71 contains a position or positions of erased objects, the object arrangement changing unit 41 may change the positions of objects clockwise or counterclockwise among the objects placed in areas other than the positions of erased objects.

The object placing unit 45 may generate plural kinds of objects with equal probability by generating random numbers. In another example, the object placing unit 45 may determine the occurrence of the kinds of objects with their respective probabilities based on the distribution of the kinds of objects remaining unerased in the game field 70. For example, if few objects "1" remain in the game field 70, then objects "1" may be generated with a higher probability.

Before finalizing the placement of the newly generated objects, the object placing unit 45 may have the arrangement condition determining unit 42 check to see whether there are objects meeting the arrangement condition. And if there are ones meeting the arrangement condition, the object placing unit 45 may cancel the placement of such objects and generate objects afresh or may change the arrangement in such a manner that they do not meet the arrangement condition. Such a design also applies to when the object placing unit 45 places objects in the game field 70 at the start of the game. The object placing unit 45 stores the kinds of objects generated in the kind field 82 of the object database 60 and changes data in the status field 84 thereof to "normal".

A fixed-object management unit 46 measures time elapsed from when each object was last moved, and determines objects which are to be changed to the fixed objects, based on the elapsed time. The fixed-object management unit 46 updates the elapsed time field 83 of the object database 60 at predetermined time intervals and, when changing the objects to the fixed objects, changes the status in the status fields 84 of the objects to "fixed". Also, as the arrangement of objects are changed by the object arrangement changing unit 41, the fixed-object management unit 46 resets the elapsed time fields 83 to "zero".

The fixed-object management unit 46 may reference the object database 60 with predetermined timing and determine whether each object having "normal" in the status field 84 is to be changed to the fixed object or not, in the order starting from an object having longer elapsed time. The fixed-object management unit 46 may set the probability of objects being changed to the fixed objects to an equal probability or may change the objects to the fixed objects with a higher probability given to an object having a longer elapsed time. In another example, the fixed-object management unit 46 may change objects, whose elapsed time has exceeded a predetermined upper limit, to the fixed objects.

The object arrangement changing unit 41 verifies the status of four objects contained in the cursor 71 by referencing the object database 60. And if the statuses of all four objects are "fixed", then the object arrangement changing unit 41 will prohibit the change of object arrangement. If any object whose status is "normal" is contained in the cursor 71, the change of position may be granted even though there is any object whose status is "fixed" therein. In this manner, the change of "fixed" objects is restricted. In another example, the object arrangement changing unit 41 may prohibit the change of position of any object whose status is "fixed". In such a case, the object arrangement changing unit 41 may change the positions of objects clockwise or counterclockwise among objects whose statuses are "normal". Similarly, the object arrangement changing unit 41 may prohibit the change of position of any object whose status is "to be erased".

When a condition, for example, where a predetermined number of objects are erased is met, the object placing unit 45 may generate "special" objects. The object placing unit 45 may select any of the newly generated objects as a "special" object or select any of the objects already arranged in the game field as a "special" object. For the latter case, the object placing unit 45 changes the status fields 84 of the applicable objects in the object database 60 to "special".

The "special" objects are treated as any kind of object by the arrangement condition determining unit 42. In other words, if three objects other than the "special" object within a range of four (2 vertical times 2 horizontal) objects containing the "special" object are all the same kind, the "special" object will also be treated as said kind of object and the arrangement condition will be met. In this case, the arrangement condition determining unit 42 selects all objects, which belong to the same kind of to-be-erased objects placed in the game field, as ones to be erased. If the "special" objects belong to the same kind, they may be selected as the objects to be erased. The object kind changing unit 43 may change only the kind of objects that meet the arrangement condition or may change the kind of all objects selected as ones to be erased. As a result, the user is given a chance to erase a large number of objects at a time. "Special" objects may be changed back to "normal" objects after placed as the "special" objects for a predetermined time period or longer.

Referring to Figures, detailed operations of a game will be explained. The control unit 40 inquires of the user about which game mode he/she is to play, before a game is started. For example, a mode where a game continues until all objects become "fixed" objects and cannot change their positions, a mode where players compete to gain high scores within a predetermined time interval, and a mode where a puzzle is designed to be solved such that all objects are erased within a predetermined number of changes in arrangement may be set as the game mode. According to a game mode selected by the user, the control unit 40 has the object arrangement unit 40 place the objects and starts the game.

Figure 4:
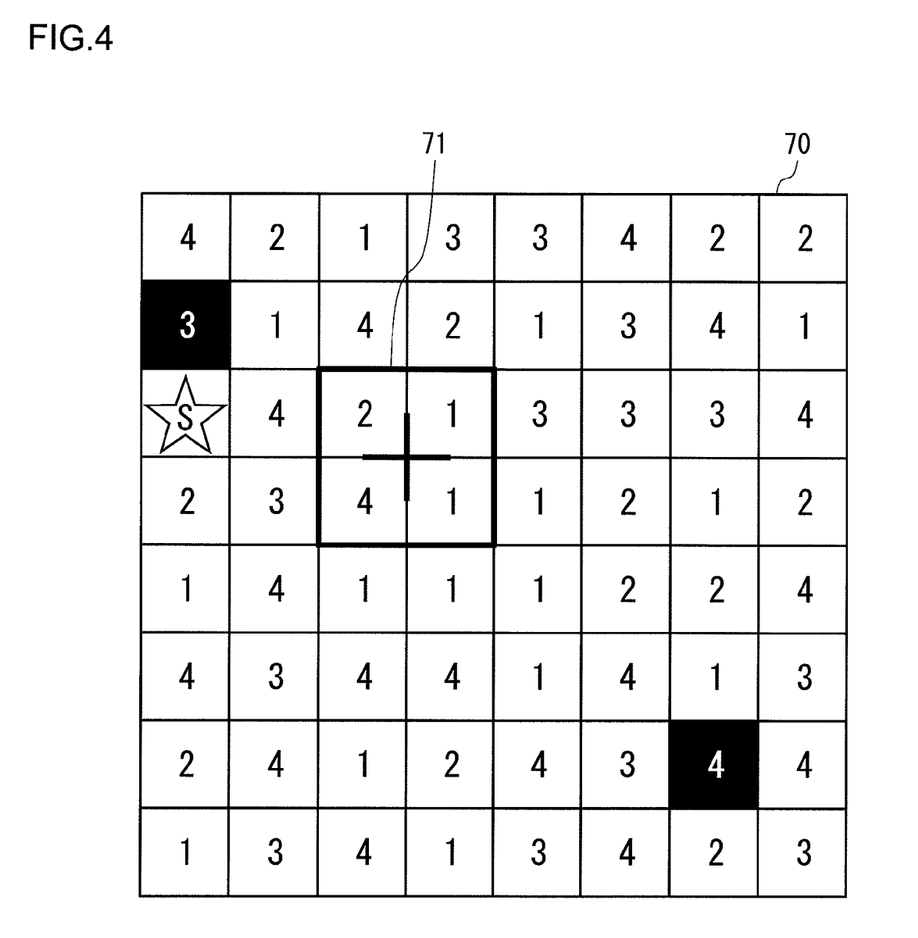
FIG. 4 shows an example of a screen displayed on a display unit.

In FIG. 2, objects in the white background indicate the "normal" objects, black objects the "fixed" objects, and a starred object the "special" object. When in the state shown in FIG. 2 the user enters an instruction input to rotate the objects within the cursor 71 clockwise, the object arrangement changing unit 41 rotates the four objects, contained in the cursor 71, clockwise. This state is shown in FIG. 4.

Figure 5:
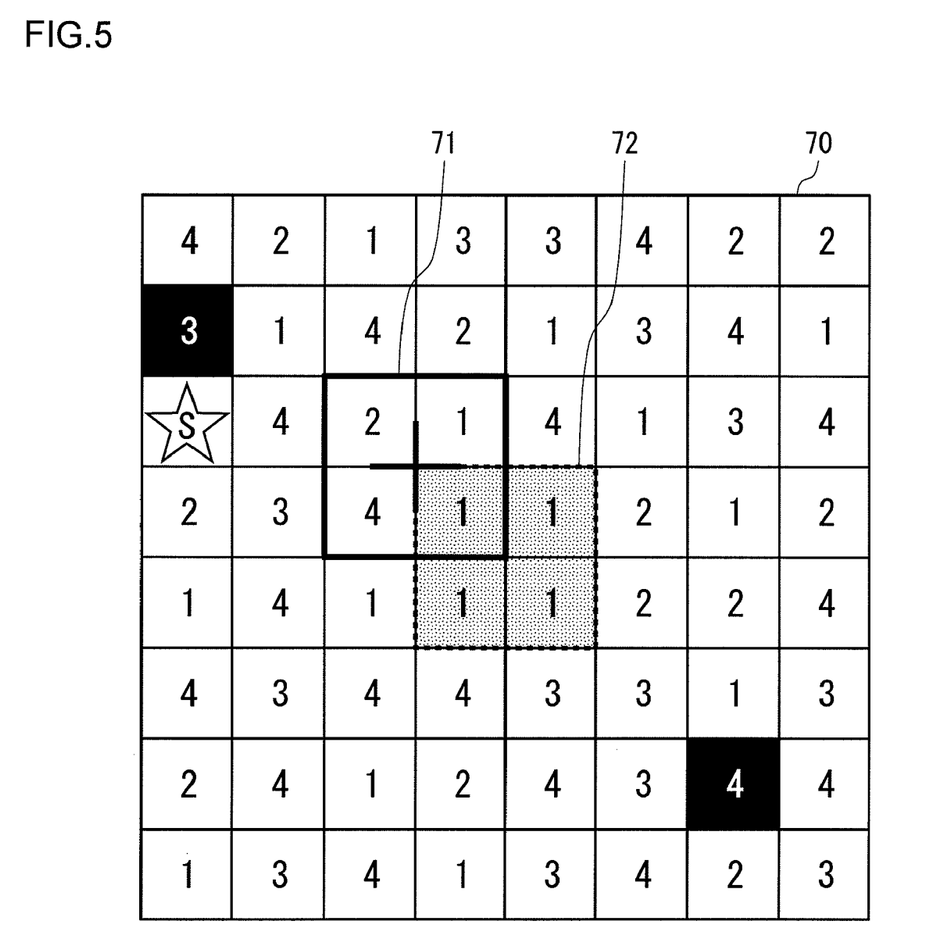
FIG. 5 shows an example of a screen displayed on a display unit.

In this state the arrangement condition determining unit 42 searches for objects that meet the arrangement condition. Since, as shown in FIG. 5, four of objects "1" line up within a range 72 of four (2 vertical times 2 horizontal) objects, the arrangement condition determining unit 42 selects these four objects as those to be erased.

Figure 6:
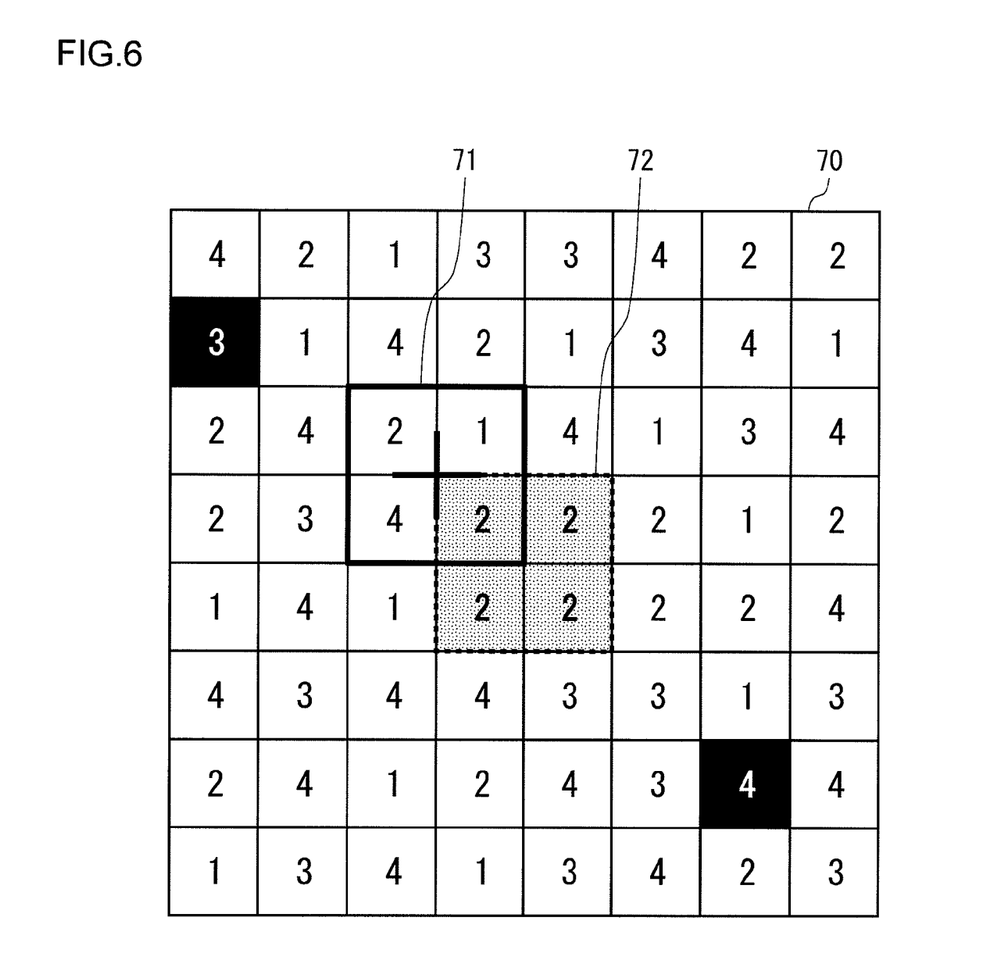
FIG. 6 shows an example of a screen displayed on a display unit.

Then, the object kind changing unit 43 changes the kind of four objects contained in the range 72 to "2" from "1". This state is shown in FIG. 6.

Figure 7:
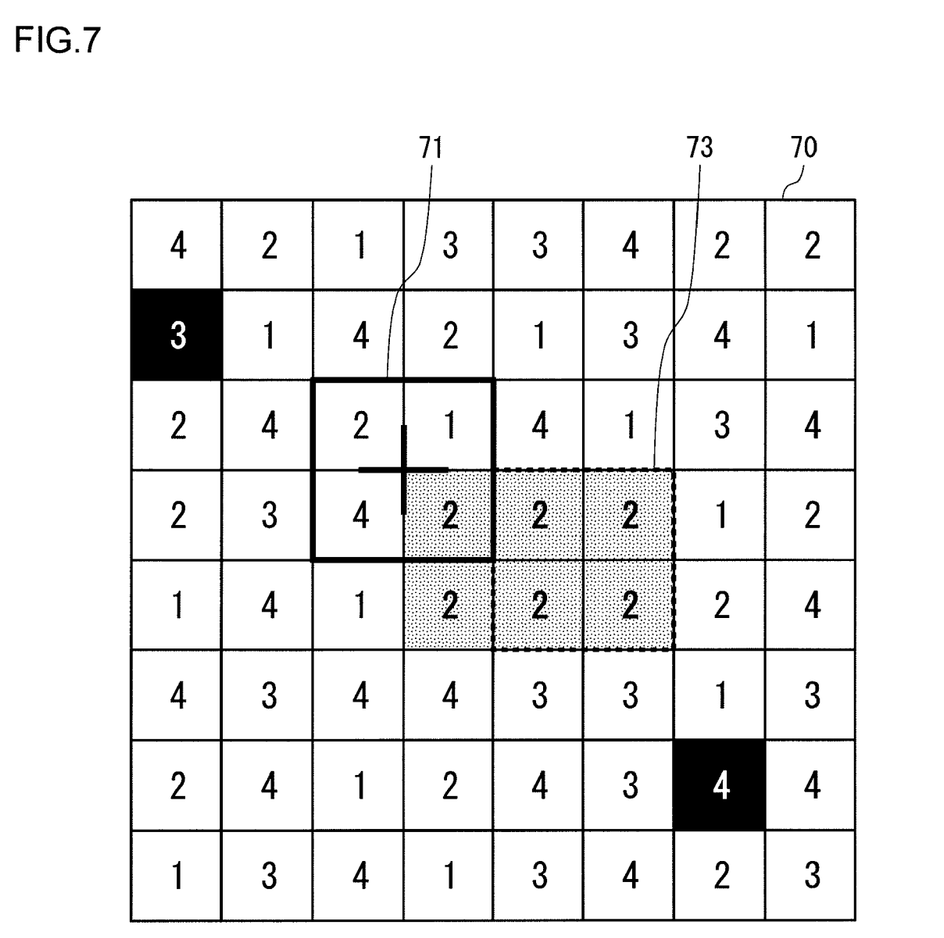
FIG. 7 shows an example of a screen displayed on a display unit.

In this state the arrangement condition determining unit 42 again searches for objects that meet the arrangement condition. Since, as shown in FIG. 7, four of objects "2" line up within a range 73 of four (2 vertical times 2 horizontal) objects, the arrangement condition determining unit 42 selects these four objects as those to be erased.

Figure 8:
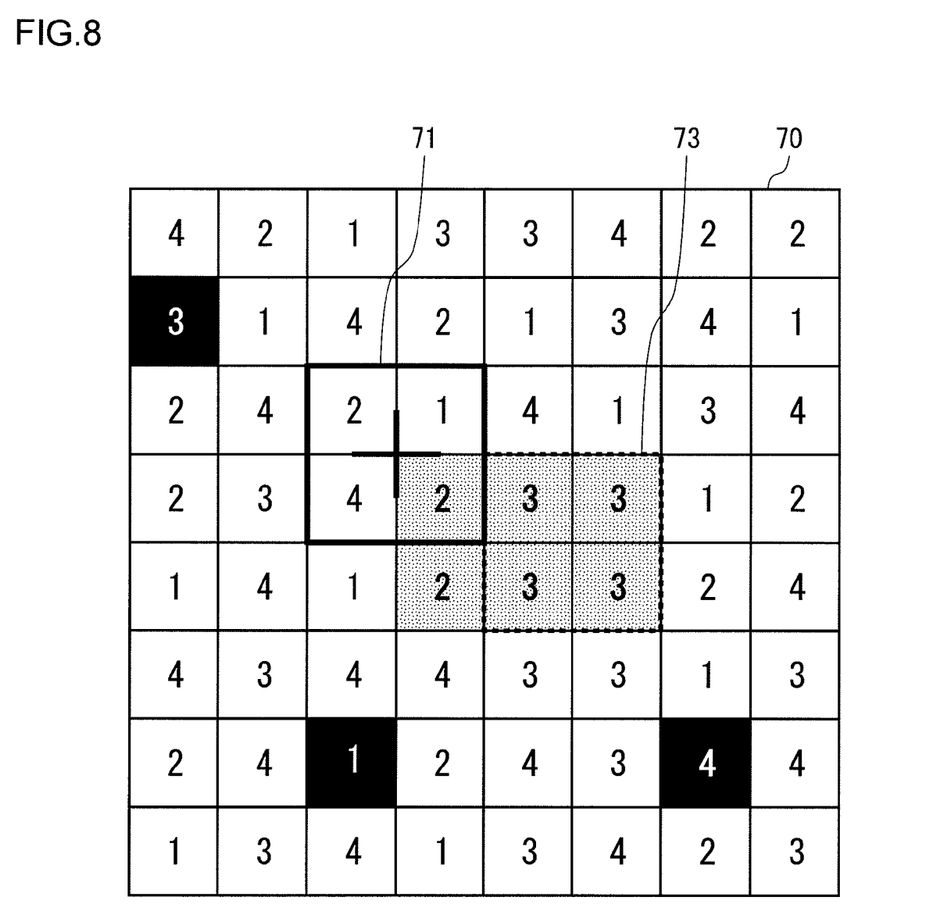
FIG. 8 shows an example of a screen displayed on a display unit.

Then, the object kind changing unit 43 changes the kind of four objects contained in the range 73 to "3" from "2". This state is shown in FIG. 8.

Figure 9:
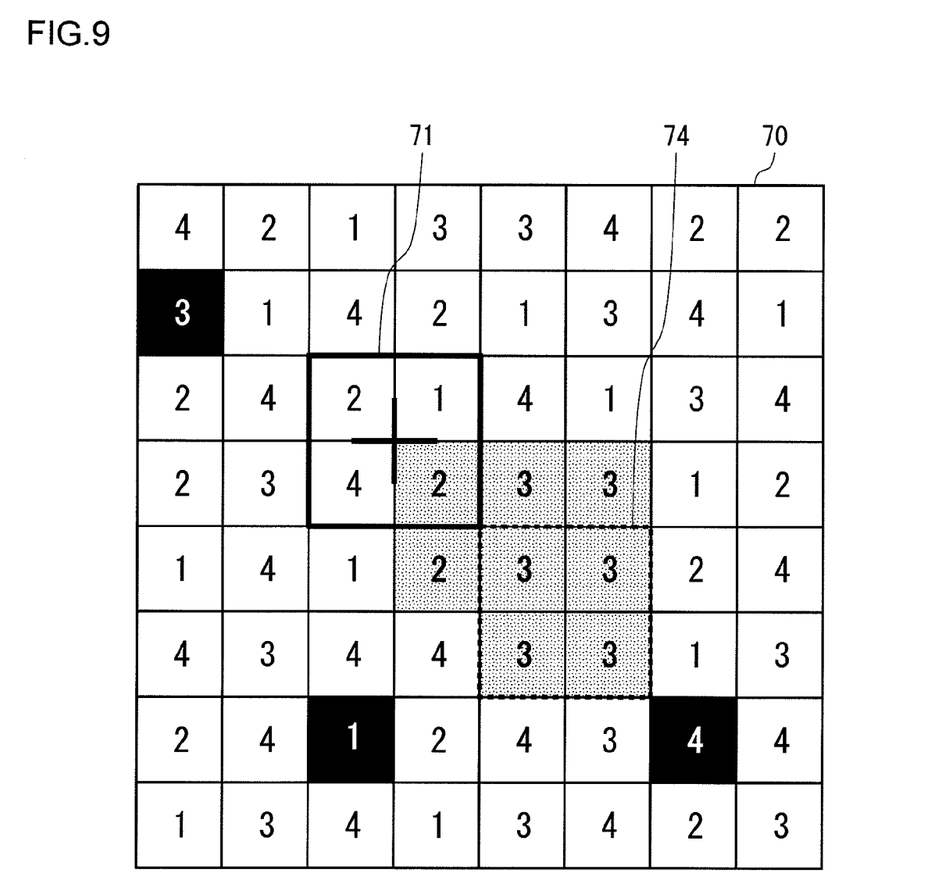
FIG. 9 shows an example of a screen displayed on a display unit.

In this state the arrangement condition determining unit 42 again searches for objects that meet the arrangement condition. Since, as shown in FIG. 9, four of objects "3" line up within a range 74 of four (2 vertical times 2 horizontal) objects, the arrangement condition determining unit 42 selects these four objects as those to be erased.

Figure 10:
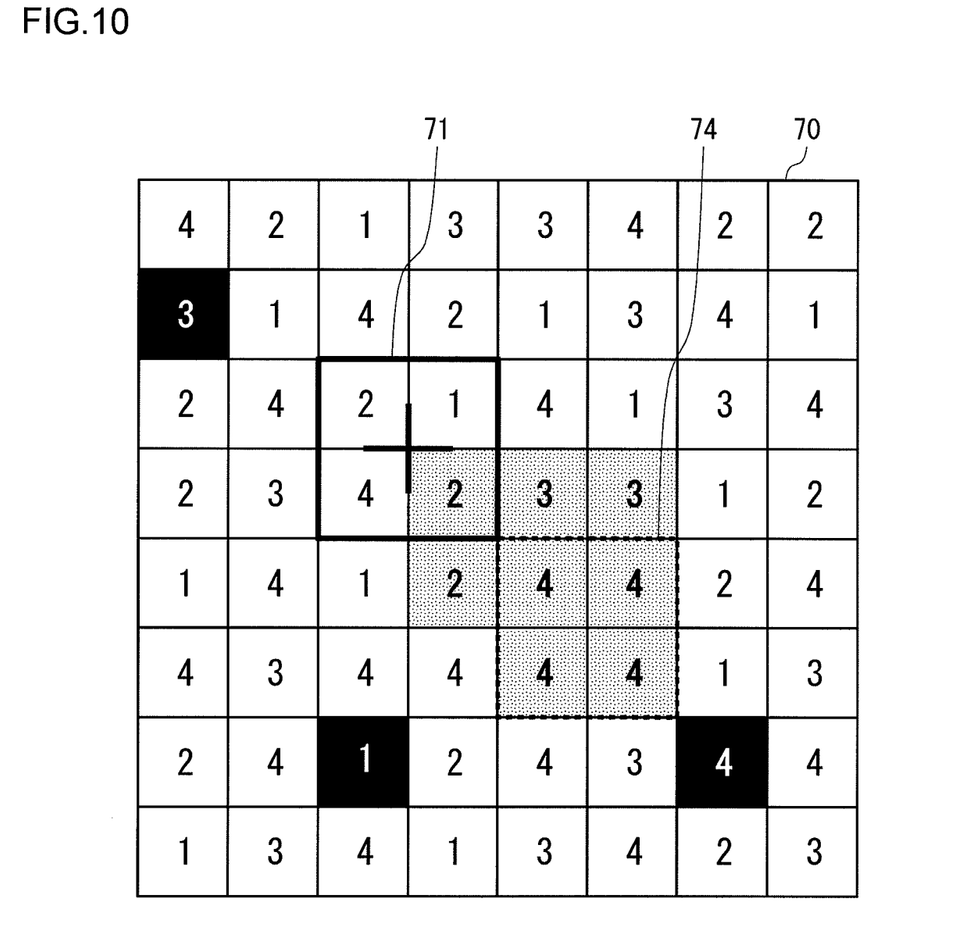
FIG. 10 shows an example of a screen displayed on a display unit.

Then, the object kind changing unit 43 changes the kind of four objects contained in the range 74 to "4" from "3". This state is shown in FIG. 10.

Figure 11:
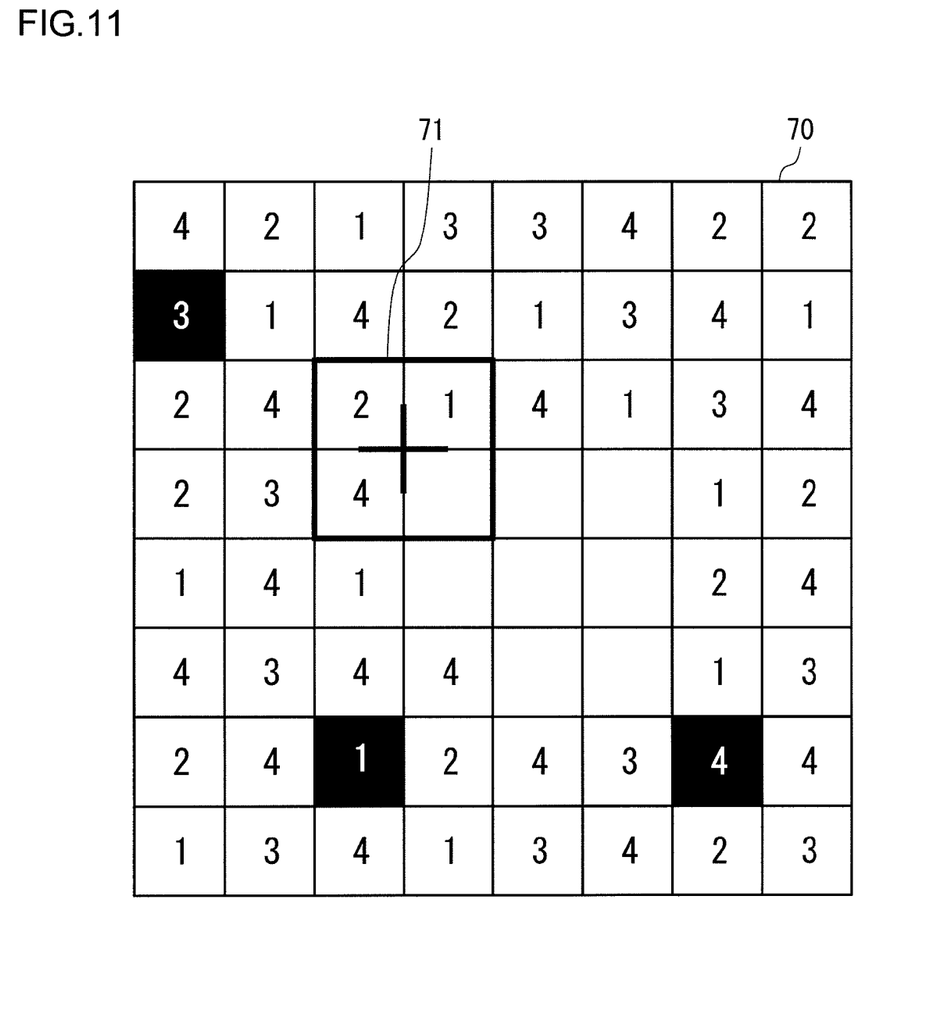
FIG. 11 shows an example of a screen displayed on a display unit.

Then the arrangement condition determining unit 42 further searches for objects that meet the arrangement condition but it is found that there is no longer any object that meets the arrangement condition. Thus, after a predetermined time lapse the object erasing unit 44 simultaneously erases the whole of the objects to be erased. This state is shown in FIG. 11.

By employing such techniques as described above, the changed kind of objects are placed in their surroundings in a manner, for example, that not only the arrangement of objects is simply so changed as to meet the arrangement condition but also changing the kind of objects that have already met the arrangement condition is taken into consideration. Hence, the techniques exemplified in the embodiments provide the users with the entertainment of thinking about new strategies. As a result, innovative and unwearying games are achieved.

The present invention has been described based upon illustrative exemplary embodiments. These exemplary embodiments are intended to be illustrative only and it will be obvious to those skilled in the art that various modifications to the combination of constituting elements and processes could be developed and that such modifications are also within the scope of the present invention.

What is claimed is:

1. A non-transitory computer readable medium storing a game control program executed by a computer, the program comprising:
   a module for managing data of objects in an object database in a memory, the objects being of plural kinds and placed in a two-dimensional or a three-dimensional game field;
   a module for changing an arrangement of the objects following an instruction from an input device by a user and updating the object database in the memory;
   a module for determining objects that meet an arrangement condition for erasure thereof out of a plurality of objects placed in the game field and selecting the objects that meet the arrangement condition as objects to be erased by referring to the object database in the memory;
   a module for changing the kind of the objects selected as objects to be erased, sequentially cycling through the plurality of kinds objects, and updating the object database in the memory; and
   a module for erasing the objects selected as objects to be erased after a predetermined time lapse from the changing of the kind thereof by the module for changing the kind thereof, and updating the object database in the memory,
   wherein the module for determining the objects to be erased determines again objects that meet the arrangement condition and further selects objects that newly meet the arrangement condition as objects to be erased, during a time period from the changing of the kind of the objects selected as objects to be erased by the module for changing the kind thereof to the erasure of the objects by the module for erasing the objects by referring to the object database in the memory.

2. The non-transitory computer readable medium according to claim 1, further comprising a module for restricting the change of the arrangement of objects, based on a time lapse from the changing of the arrangement by the module for changing the arrangement of objects.

3. A game device comprising:
   an object database stored in a memory, for storing data of objects which are of plural kinds and placed in a two-dimensional or a three-dimensional game field;
   an object arrangement changing unit configured to change an arrangement of the objects following an instruction from an input device by a user and to update the object database in the memory;
   an arrangement condition determining unit configured to determine objects that meet an arrangement condition for erasure thereof out of a plurality of objects placed in the game field and select the objects that meet the arrangement condition as objects to be erased by referring to the object database in the memory;
   an object kind changing unit configured to change the kind of the objects selected as objects to be erased, sequentially cycling through the plurality of kinds of objects, and to update the object database in the memory; and
   an object erasing unit configured to erase the objects selected as objects to be erased after a predetermined time lapse from the changing of the kind thereof by the object kind changing unit, and to update the object database in the memory,
   wherein the arrangement condition determining unit determines again objects that meet the arrangement condition and further selects objects that newly meet the arrangement condition as objects to be erased, during a time period from when the kind of the objects selected as objects to be erased is changed by the object kind changing unit to when the objects are erased by the object erasing unit by referring to the object database in the memory.

4. A method for controlling a game, the method comprising:
   managing data of objects in an object database in a memory, the objects being of plural kinds and placed in a two-dimensional or three-dimensional game field;
   changing an arrangement of the objects following an instruction from an input device by a user and updating the object database in the memory;
   determining objects that meet an arrangement condition for erasure thereof out of a plurality of objects placed in the game field and selecting the objects that meet the arrangement condition as objects to be erased by referring to the object database in the memory;
   changing the kind of the objects selected as objects to be erased, sequentially cycling through the plurality of kinds of objects, and updating the object database in the memory; and
   determining again objects that meet the arrangement condition and selecting objects that newly meet the arrangement condition as objects to be erased by referring to the object database in the memory; and
   erasing the objects selected as objects to be erased and updating the object database in the memory.

5. The game device according to claim 3, further comprising an object managing unit configured to restrict the change of the arrangement of objects, based on a time lapse from the changing of the arrangement by the object arrangement changing unit.

6. The method according to claim 4, further comprising restricting the change of the arrangement of objects, based on a time lapse from the changing of the arrangement of objects.

* * * * *